United States Patent
Baldwin (10) Patent No.: US 10,455,782 B2
(45) Date of Patent: Oct. 29, 2019

(54) GARDEN WATERING CONTROLLERS

(71) Applicant: HOZELOCK LIMITED, Birmingham (GB)

(72) Inventor: John Baldwin, Worcestershire (GB)

(73) Assignee: HOZELOCK LIMITED, Birmingham (GB)

(*) Notice: Subject to any disclaimer, the term of this patent is extended or adjusted under 35 U.S.C. 154(b) by 85 days.

(21) Appl. No.: 15/574,752

(22) PCT Filed: May 16, 2016

(86) PCT No.: PCT/GB2016/051402
§ 371 (c)(1),
(2) Date: Nov. 16, 2017

(87) PCT Pub. No.: WO2016/185188
PCT Pub. Date: Nov. 24, 2016

(65) Prior Publication Data
US 2018/0139913 A1    May 24, 2018

(30) Foreign Application Priority Data
May 18, 2015  (GB) .................................. 1508491.6

(51) Int. Cl.
*G06F 19/00*    (2018.01)
*A01G 25/16*    (2006.01)

(52) U.S. Cl.
CPC .................................. *A01G 25/165* (2013.01)

(58) Field of Classification Search
CPC .............. Y02B 10/20; F02C 1/05; F03D 9/10
See application file for complete search history.

(56) References Cited

U.S. PATENT DOCUMENTS

| | | | |
|---|---|---|---|
| 3,978,887 A | 9/1976 | Dryla | |
| 5,647,388 A | 7/1997 | Butler, Jr. et al. | |
| 5,823,431 A * | 10/1998 | Pierce | B05B 17/08 239/19 |
| 8,849,461 B2 * | 9/2014 | Ersavas | A01G 25/167 700/275 |
| 2005/0171646 A1 | 8/2005 | Miller | |

(Continued)

FOREIGN PATENT DOCUMENTS

| CN | 104509426 A | 4/2015 |
|---|---|---|
| FR | 2494083 A1 | 5/1982 |

(Continued)

OTHER PUBLICATIONS

Patent Cooperation Treaty, International Search Report for PCT/GB2016/051402 dated Jun. 27, 2016, 4 pages.

(Continued)

*Primary Examiner* — Kidest Bahta
(74) *Attorney, Agent, or Firm* — Heslin Rothenberg Farley & Mesiti P.C.; Victor A. Cardona, Esq.

(57) ABSTRACT

A garden watering controller for operating a valve for controlling a supply of water into a garden watering arrangement includes a light sensor for sensing ambient light levels and a central unit for receiving sensed light level signals from the light sensor and for outputting control signals for operating the valve in dependence on the sensed light level signals. The central unit may be arranged to determine the occurrence of dawn and dusk.

21 Claims, 6 Drawing Sheets

(56) References Cited

U.S. PATENT DOCUMENTS

| | | | |
|---|---|---|---|
| 2007/0089365 A1* | 4/2007 | Rowe | A01G 27/003 47/79 |
| 2009/0320363 A1 | 12/2009 | Matlen | |
| 2012/0221154 A1 | 8/2012 | Runge | |
| 2015/0164009 A1* | 6/2015 | Chandran | G05B 15/02 700/284 |
| 2016/0207060 A1 | 7/2016 | Chou | |

FOREIGN PATENT DOCUMENTS

| | | |
|---|---|---|
| FR | 2529748 A1 | 1/1984 |
| FR | 2751840 A1 | 2/1998 |
| GB | 1555430 | 11/1979 |
| GB | 2449765 A | 12/2008 |

OTHER PUBLICATIONS

Patent Cooperation Treaty, Written Opinion of the International Searching Authority for PCT/GB2016/051402 dated Jun. 27, 2016, 7 pages.

\* cited by examiner

GARDEN WATERING CONTROLLERS

CROSS REFERENCE TO RELATED APPLICATIONS

This application is a national stage filing under section 371 of International Application No. PCT/GB2016/051402 filed on May 16, 2016, published in English on Nov. 24, 2016, as WO2016/185188 A1 and which claims priority to Great Britain Application No. 1508491.6 filed on May 18, 2015, the entire disclosure of these applications being hereby incorporated herein by reference.

TECHNICAL FIELD

This invention relates to garden watering controllers and garden watering controller units (sometimes also known as water computers). Garden watering controller units are used for controlling home watering arrangements such as micro-irrigation systems by turning the water supply on to allow watering at preselected times or under preselected conditions.

BACKGROUND

Typically a garden water controller unit is mountable on an outside tap which is left in "on" position whereas the garden water controller unit controls whether water is actually able to enter the garden watering arrangement via a hose connected to an outlet of the garden watering controller unit.

Some garden watering controller units offer only very simple timer based operation and may, for example, be programmable to water for thirty minutes at the time specified by an internal clock. Other units may be more complex and have a screen based programmable functionality similar to say a central heating control such that various "on" and "off" times may be set and these might be set to occur everyday or only on certain programmed days.

A difficulty with these systems is that they are complex and time consuming to program. Further they do not necessarily lead to watering at optimum times with reference to the differing number of daylight hours as one moves through the year. A user, for example, might prefer to have watering occur at dusk every day, but on a timed based programmable system this would only be possible if the programmed time of watering is altered on a regular basis.

Thus it would be desirable to have a garden watering controller unit which facilitates ease of use whilst also allowing the user to cause watering to occur at desired times and provide a relatively high degree of flexibility for the user in terms of how and when watering should take place.

SUMMARY

According to a first aspect of the present invention there is provided a garden watering controller for operating a valve for controlling supply of water into a garden watering arrangement, the controller comprising a light sensor for sensing ambient light levels, and a central unit for receiving sensed light level signals from the light sensor and for outputting control signals for operating the valve in dependence on the sensed light level signals.

According to a second aspect of the present invention there is provided a tap mountable garden watering controller unit comprising a valve for controlling supply of water from a tap into a garden watering arrangement, and a garden watering controller as defined above for operating the valve.

Typically the valve will be an electrically operated valve, for example a motor driven valve or a solenoid valve.

Such arrangements allow the control of watering to be dependent on light levels. In particular it can help avoid watering during the middle of the day when evaporation will be higher and, in some circumstances, plants may be scorched. Dawn and dusk are considered favourable times for watering.

The central unit may be arranged to determine the occurrence of dawn and/or dusk at the location of the controller in dependence on the sensed light level signals. Preferably the central unit is arranged to determine the occurrence of dawn and dusk. This can facilitate watering at desirable times and give flexibility.

The central unit may be arranged to operate the valve to allow watering when the occurrence of dawn and/or dusk has been determined.

The central unit may be programmable such that the control signals output by the central unit, and hence resulting operation of the valve, are dependent on a stored program. The stored program may in turn operate in dependence on the determination by the central unit of dawn and/or dusk.

The garden watering controller may comprise a user interface for allowing a user to program the operation of the central unit.

The user interface may comprise one or more user controls, preferably control knobs, for use in programming the operation of the central unit. This can provide ease of use compared with a screen and menu based user interface.

Preferably there is a single control knob or only two control knobs. Again this can promote ease of use.

The user interface may comprise a first user control, preferably a control knob, for indicating whether watering should occur at dusk, dawn, or dawn and dusk. The first user control may also be arranged for indicating the duration for which watering should occur at the selected time(s). The operative range of the first user control may have three segments, a first segment corresponding to operation of the valve at dawn, a second segment corresponding to operation of the valve at dusk, and a third segment corresponding to operation of the valve at dawn and dusk. Respective positions within each segment may correspond to respective durations of watering operation at the selected time(s). Where the first user control is a control knob the respective positions will be angular positions within the segment.

The user interface may comprise a second user control, preferably a control knob, for indicating whether watering should occur every day or at specified intervals of days. The second user control may be arranged for indicating that watering should occur at a selected one of: every day, every 2 days, every 3 days, every 5 days or every 7 days.

The user interface may comprise a user override control that operates the valve to allow immediate watering. The override control may allow selection of a defined period of watering. The override control may be a button. The button may be arranged so that subsequent presses of the button cause cycling through an available range of watering durations.

It will be appreciated that in each case operation of one of the user controls causes corresponding programming of the central unit.

The tap mountable garden watering controller unit may comprise a main body which houses the valve. The main body may also house the valve's respective drive means. Thus, for example, the main body may house a motor driven valve and its motor, or a solenoid operated valve. The garden watering controller may be detachably mountable on the main body.

The central unit may be arranged to calculate a rolling average of the light level sensed by the sensor for use in determining the occurrence of dawn and/or dusk. The central unit may be arranged to calculate the rolling average from the 4 most recent readings. The central unit may be arranged to take one reading every minute when in an operating mode.

The central unit may be arranged to determine the occurrence of dawn when the following are satisfied:
i) the rolling average is increasing;
ii) the latest rolling average is no more than a predetermined amount above the preceding rolling average; and
iii) the latest rolling average is above a first minimum threshold value.

This can help identify dawn on the basis of a consistent gradual increase in light levels, helping to ignore noise, or nuisance light changes caused by security lights or so on.

If the above conditions are not satisfied the central unit may be arranged to still determine the occurrence of dawn when the following is satisfied:
the latest rolling average is above a second minimum threshold value, which is above the first minimum threshold value.

This second minimum threshold can be set a relatively high level as a fall back. This might cause watering at a slightly less favourable time but can help avoid failure to water at all. The first minimum threshold might be 30 Lux, the second minimum threshold might be 130 Lux.

Said predetermined amount may be proportional to the absolute value of the rolling average. Said predetermined amount may be in the range of 10% to 15%, say 12.5%, of the rolling average.

The central unit may be arranged to determine the occurrence of dusk when the following are satisfied:
i) the rolling average is decreasing;
ii) the latest rolling average is no more than a predetermined amount below the preceding rolling average; and
iii) the latest rolling average is below a first maximum threshold value.

This can help identify dusk on the basis of a consistent gradual decrease in light levels, helping to ignore noise, or nuisance light changes caused by shadows or temporary obscuring of the sensor or so on.

If the above conditions are not satisfied the central unit may be arranged to still determine the occurrence of dusk when the following is satisfied:
the latest rolling average is below a second maximum threshold value, which is below the first maximum threshold value.

This second maximum threshold can be set a relatively low level as a fall back. This might cause watering at a slightly less favourable time but can help avoid failure to water at all.

The first maximum threshold might be 18 Lux, the second maximum threshold might be 6 Lux.

Said predetermined amount may be proportional to the absolute value of the rolling average. Said predetermined amount may be in the range of 10% to 15%, say 12.5%, of the rolling average.

The central unit may be arranged to have a lock out period after a determination of the occurrence of dusk and/or dusk during which period the central unit will not determine another occurrence of dawn and/or dusk.

This helps prevent false detection of dawn and/or dusk and hence helps prevent more watering operations than are desired.

The lock out period may be 6 hours.

The central unit may be arranged to assume that dawn must have occurred if a predetermined fall back period expires after the occurrence of dusk was last determined without dawn having been determined to have occurred. The central unit may be arranged to assume dusk must have occurred if a predetermined fall back period expires after the occurrence of dawn was last determined without dusk having been determined to have occurred.

This helps ensure that programmed watering will occur at some stage even if there is a failure to detect dawn and/or dusk.

The fall back period may be 14 hours.

According to another aspect of the present invention there is provided a garden watering controller for operating a valve for controlling supply of water into a garden watering arrangement, the controller comprising a light sensor for sensing ambient light levels, and a central unit arranged under the control of software for receiving sensed light level signals from the light sensor and for outputting control signals for operating the valve in dependence on the sensed light level signals.

According to another aspect of the present invention there is provided a garden watering controller for operating a valve for controlling supply of water into a garden watering arrangement, the controller comprising a light sensor for sensing ambient light levels, and a central unit for receiving sensed light level signals from the light sensor and for outputting control signals for operating the valve, the central unit being arranged under the control of software to:
a) calculate a rolling average of the light level sensed by the sensor;
b) determine the occurrence of dawn when the following are satisfied:
i) the rolling average is increasing;
ii) the latest rolling average is no more than a predetermined amount above the preceding rolling average; and
iii) the latest rolling average is above a first minimum threshold value; and
c) determine the occurrence of dusk when the following are satisfied:
i) the rolling average is decreasing;
ii) the latest rolling average is no more than a predetermined amount below the preceding rolling average; and
iii) the latest rolling average is below a first maximum threshold value; and
d) output control signals for operating the valve in dependence on the determination of the occurrence of dawn and dusk.

According to another aspect of the present invention there is provided a method of operating a garden watering controller for operating a valve for controlling supply of water into a garden watering arrangement, the controller comprising a light sensor for sensing ambient light levels and the method comprising the steps of:
a) calculating a rolling average of the light level sensed by the sensor;
b) determining the occurrence of dawn if the following are satisfied:
i) the rolling average is increasing;
ii) the latest rolling average is no more than a predetermined amount above the preceding rolling average; and
iii) the latest rolling average is above a first minimum threshold value;

c) determining the occurrence of dusk if the following are satisfied:

i) the rolling average is decreasing;

ii) the latest rolling average is no more than a predetermined amount below the preceding rolling average; and iii) the latest rolling average is below a first maximum threshold value; and d) operating the valve to allow watering in dependence on the determination of the occurrence of dawn and dusk.

The optional features mentioned above following the first and second aspects of the invention are equally applicable, with any necessary changes in wording, to the above other aspects of the invention and are not re-written here merely in the interests of brevity. Thus, for example, the methods may include steps corresponding to those optional features and the central unit may be arranged under software to carry out those optional features.

BRIEF DESCRIPTION OF THE DRAWINGS

Embodiments of the present invention will now be described, by way of example only, with reference to the accompanying drawings in which.

DETAILED DESCRIPTION

Figure 1:
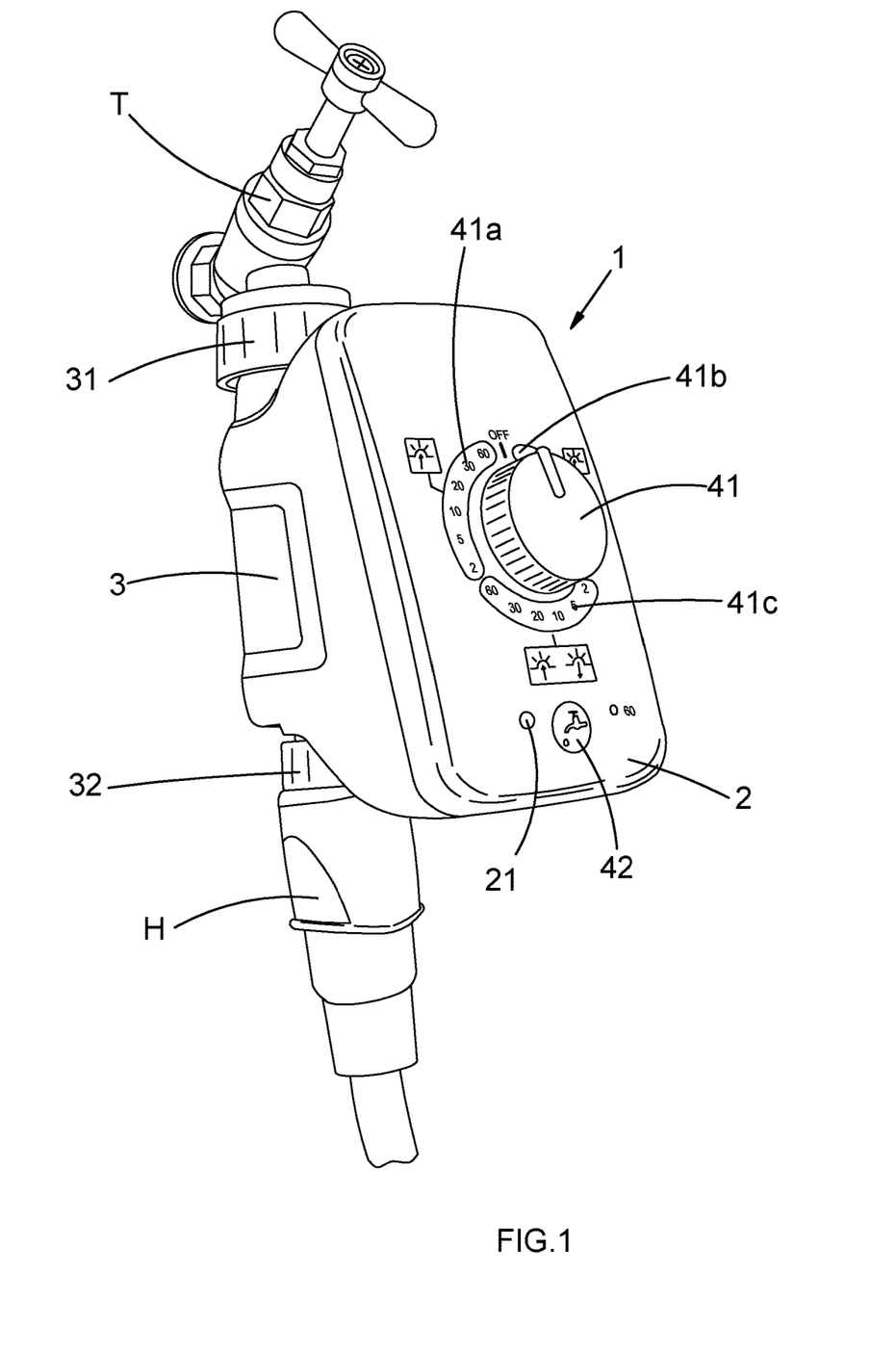
FIG. 1 schematically shows a first garden watering controller unit.

FIG. 1 shows a tap mountable watering controller unit 1 (which might also be termed a water computer) mounted on an outside tap T and with an outlet hose H connected thereto.

In terms of basic operation, the garden watering controller unit 1 sits between the tap T and the hose H and with the tap T left in the "on" position the garden watering controller unit 1 controls whether water is allowed to be supplied into the outlet hose H and hence into the remainder of a garden watering arrangement—be this a simple sprinkler or a more complex micro-irrigation system for example.

Figure 2:
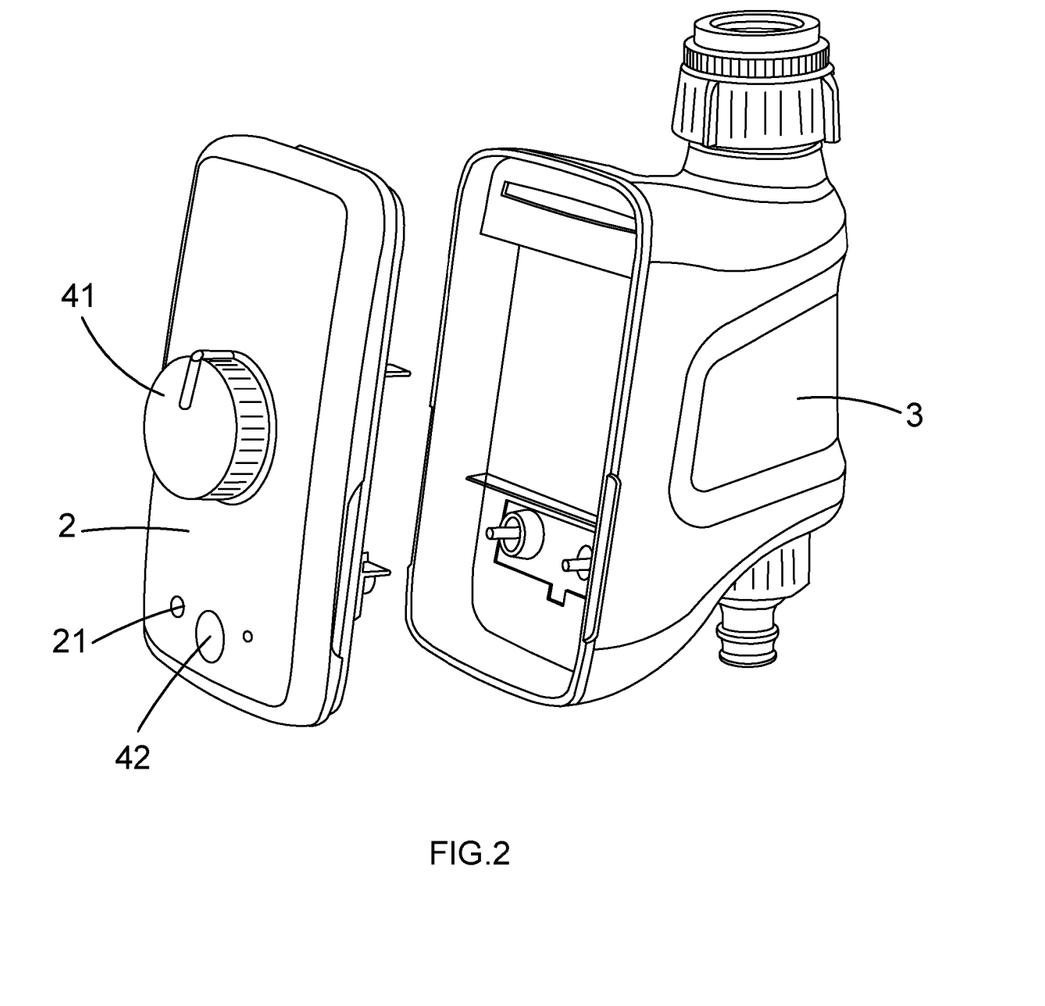
FIG. 2 schematically shows the garden watering controller unit of FIG. 1, but with a garden water controller panel of the unit separated from a main body of the unit.
Figure 3:
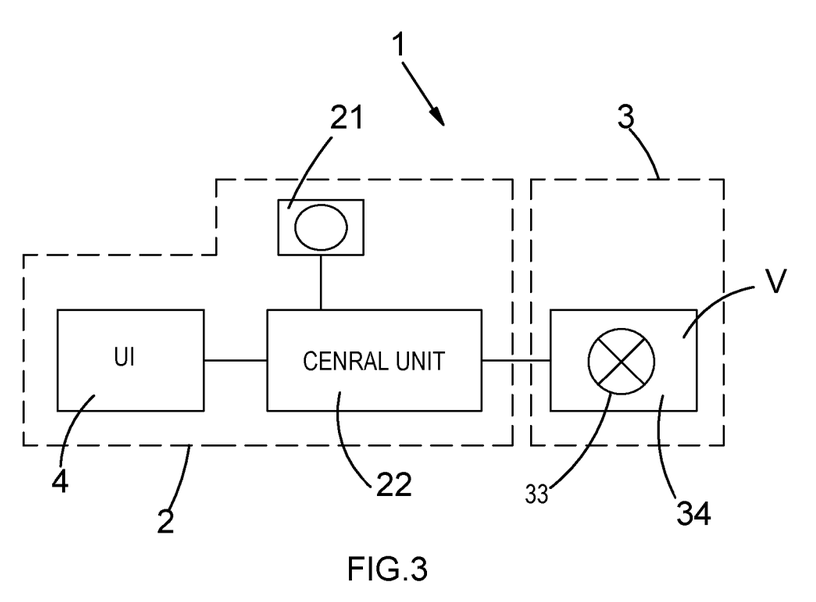
FIG. 3 shows, in highly schematic form, the functional parts of the garden watering controller unit shown in FIGS. 1 and 2.

The garden watering controller unit 1 comprises a garden watering controller panel 2 which is mounted on a main body 3. In the present embodiment the garden water controller panel 2 is detachably mounted on the main body 3 and FIG. 2 shows the garden watering controller panel 2 separated from the main body 3. On the other hand, FIG. 3 shows the garden watering controller unit 1 in highly schematic form to illustrate the particular functional elements.

The main body 3 comprises an adaptor 31 for connecting to the tap T and an adapter 32 for connecting to the hose H. Further, disposed within the main body 3 is a valve unit V comprising a valve 33 and a motor 34 for driving the valve 33 (see FIG. 3). In other embodiments the valve unit V may comprise a different type of valve and drive means such as a solenoid driven valve. As will be appreciated, this valve 33 is used to control water flow through the garden watering controlling unit 1 to allow it to have its water controlling function. The garden watering controller panel 2 in functional terms (see FIG. 3) comprises a user interface 4, the details of which will be explained in more detail below, a light sensor 21 and a central unit 22 for controlling the overall operation of the garden watering controller panel 2 and hence controller unit 1 as a whole. The central unit 22 comprises a microprocessor (not shown) and memory (not shown) to enable it to be programmed to control the operation of the watering controller unit 1. Further the central unit 22 accepts inputs from the light sensor 21 and user interface 4 and is arranged for outputting control signals to cause operation of valve unit V, in particular, the motor 34 and hence valve 33. Typically the garden controller unit 1 will be battery powered and batteries will be housed within the unit 1. These may, for example, be carried on the garden watering controller panel 2.

As can be seen in FIGS. 1 and 2, in the present embodiment, the user interface 4 comprises a control knob 41 and an immediate watering button 42.

As will be explained in more detail below, the control knob 41 can be used by the user to control operation of the unit 1 in order to cause it to open the valve 33 and hence allow watering either at dawn, at dusk or at dawn and dusk. Thus as indicated by the dials surrounding the control knob 41, the control knob's range of movement includes an off position and three different operational segments. A first of the segments 41a corresponds to programming the device to water at dawn, the second of the segments 41b corresponds to programming the device to water at dusk and a third of the segments 41c corresponds to programming the device to water at dawn and dusk. Further, different angular positions within each of these segments corresponds to programming the device to water for differing durations at each of these times. Thus in the specific embodiment, a first angular position in each segment corresponds to watering at two minutes at the specified time(s), a second—five minutes, a third—ten minutes, a fourth—twenty minutes, a fifth— thirty minutes, a sixth—sixty minutes.

Thus with the single control knob 41, the user is able to programme the device to provide watering operation at either dawn, dusk, or dawn and dusk, and to indicate the duration of watering that should occur at the selected time or times.

Thus a high degree of flexibility is provided for the user as well as the provision of watering at desirable times with a very easy programming operation for the user.

On the other hand, the water immediately button 42 can act as an override and allow immediate watering without having to change the program setting set by the control knob 41. If the user presses the water immediately button, the garden water control panel 2 causes the valve 33 to open and watering to occur. In the present embodiment the valve 33 will then remain open for sixty minutes before the valve 33 is automatically closed. If the button 42 is pressed again during that time watering stops.

Figure 4:
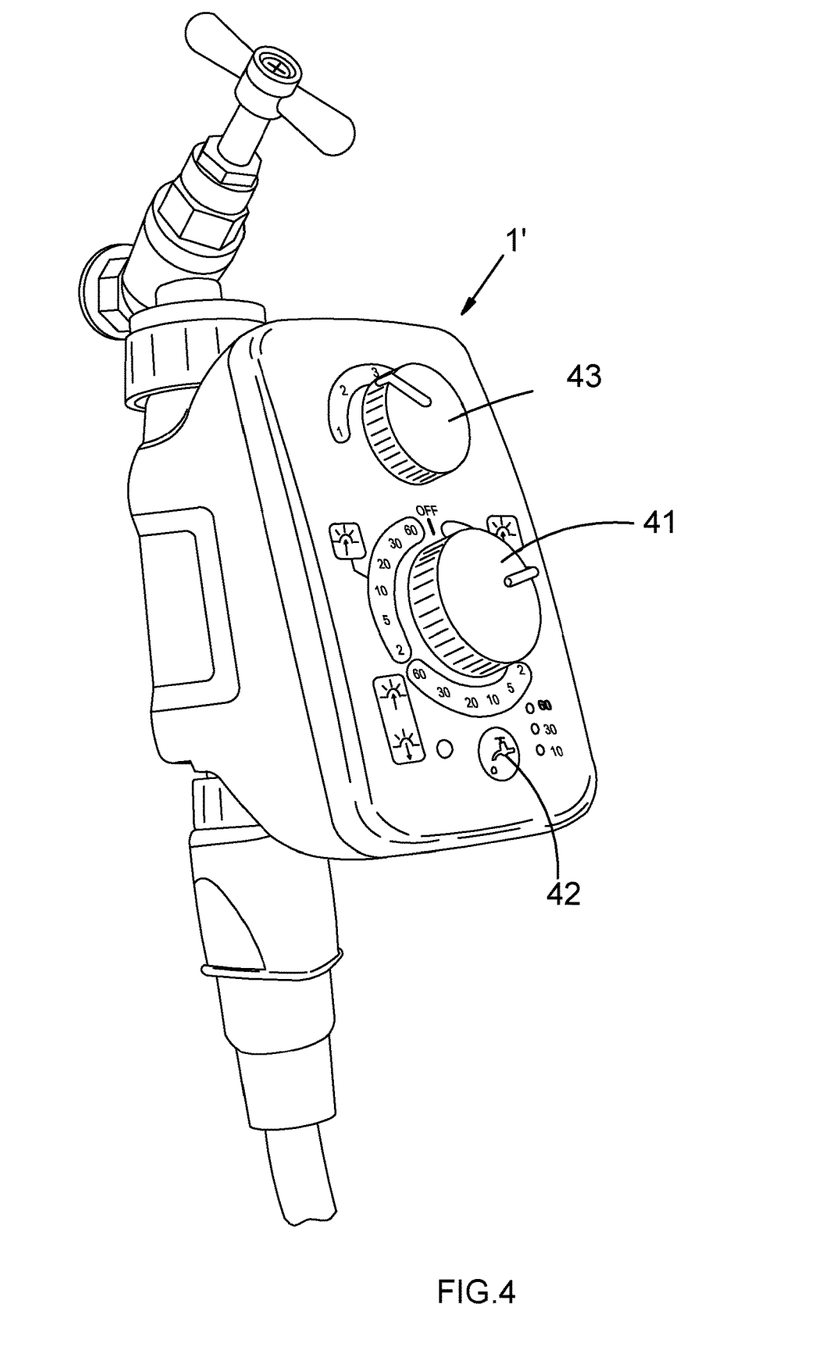
FIG. 4 schematically shows an alternative garden water controller unit.

FIG. 4 shows an alternative garden water controller unit 1' which provides the functionality of the garden watering unit 1 described above with reference to FIG. 1, but also the ability to programme the device to water either every day or only every selected number of days.

Thus in this case, the user interface includes a second control knob 43 which can be rotated through a range of positions with each position indicating how often watering should occur. In this specific embodiment a first positioning of the knob 43 corresponds to watering every day, the second position—watering every two days, a third position—watering every three days, a fourth position—watering every five days and a fifth position—watering every seven days. Thus even greater flexibility is given to the user again without compromising ease of use.

Further in this case, the water immediately button 42 provides additional choices for the user. Here one press of the button 42 will open the valve 33 for ten minutes. If the button is pressed for a second time during that ten minutes the valve 33 will stay open for thirty minutes from that second press. If the button is pressed for a third time during that thirty minutes, the valve will stay open for sixty minutes from that third press. However if the button is pressed for a fourth time in that sixty minutes the valve is closed again.

Operation of the first garden watering controller unit 1 as described with reference to FIGS. 1 to 3 will be explained in more detail below. It should be appreciated however that this description is also relevant to the operation of the alternative garden watering controller unit 1' shown in FIG. 4 with the exception in that case that the additional control knob 43 has to be taken into account and the setting on this will dictate whether the operation described below is happening every day, every other day or so on.

Figure 5:
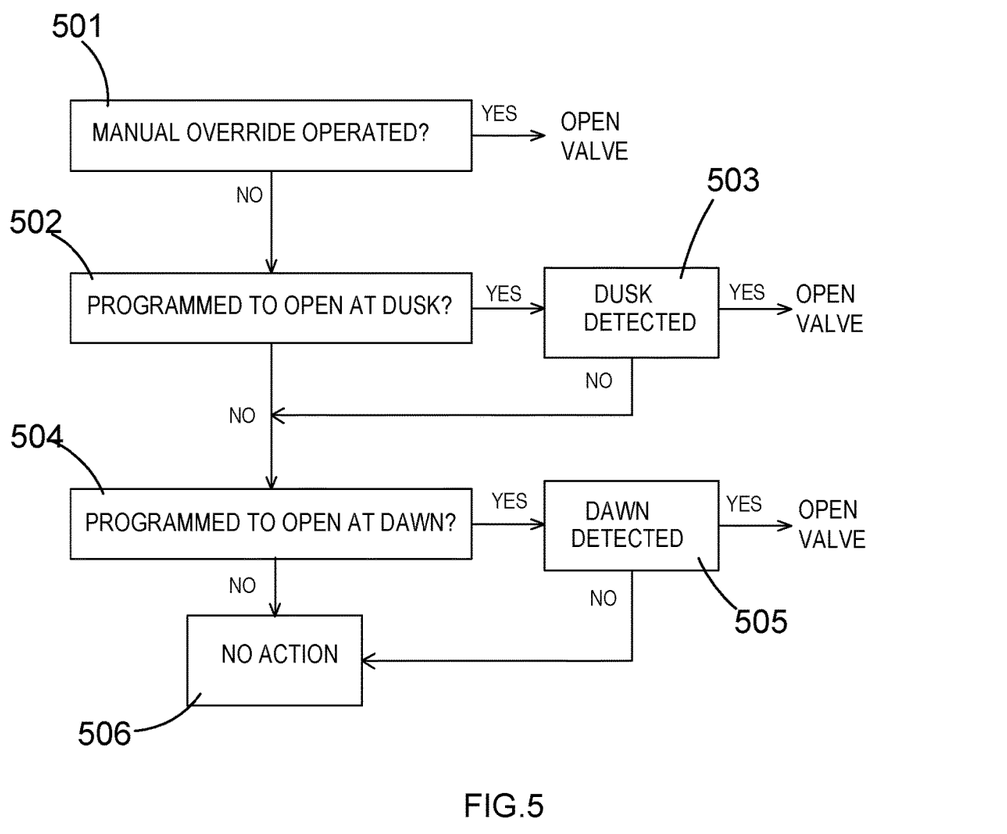
FIG. 5 shows a flow chart showing a basic overview of operation of the garden watering controller unit of FIGS. 1 to 3.

FIG. 5 shows a flow chart illustrating, at a simple level, the operation of the device and in particular the central unit 22.

In step 501 the central unit determines whether the manual override has been operated—that is, whether the water immediately button 42 has been pressed. If this has occurred then the central unit will cause the valve 33 to open. If the manual override has not been operated then in step 502 the central unit determines whether the garden watering controller unit 1 has been programmed to open the valve 33 at dusk. That is to say it detects whether the first control knob 41 is in either the segment 41b which causes watering at dusk or the segment 41c which causes watering at dawn and dusk. If it is determined that the unit is programmed to operate at dusk, then in step 503, the central unit 22 determines whether dusk has been detected (as is described in more detail below). If so, the valve 33 is opened by virtue of appropriate control signals being sent to the motor 34. If the unit 1 is not programmed to open the valve 33, or dusk is not detected, then in step 504 the central unit 22 determines whether the water controller unit 1 is programmed to open the valve 33 at dawn. If so, then in step 505 the unit determines whether dawn has been detected (as is described in more detail below) and if so, opens the valve 33. However if the unit 1 is not programmed to open the valve 33 at dawn, or dawn has not been detected, then at step 506 no action is taken at that time.

Figure 6:
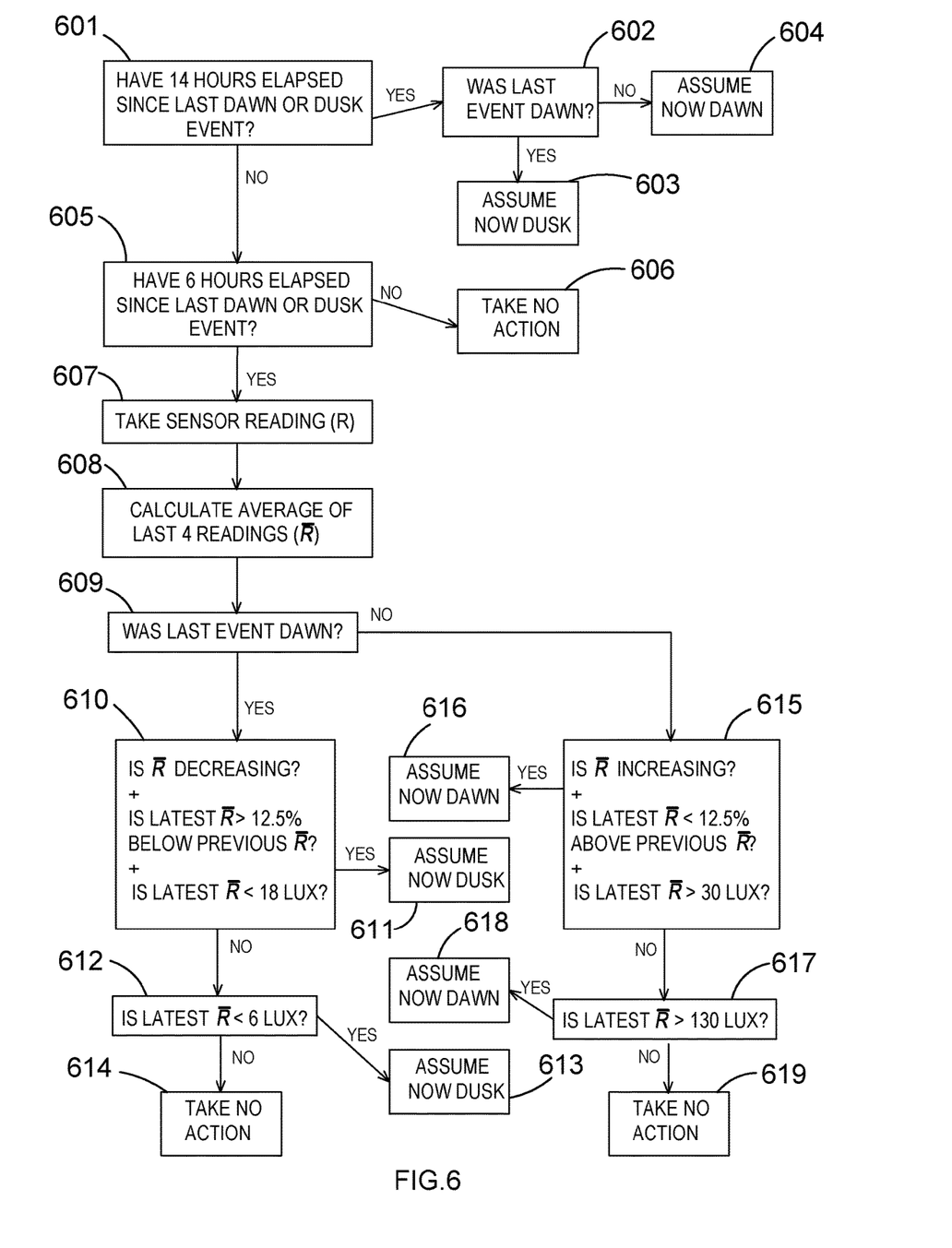
FIG. 6 is a flowchart showing operation of a central unit of the garden watering controller unit of FIGS. 1 to 3 and 5 in determining the occurrence of dawn and dusk.

FIG. 6 illustrates in more detail the series of steps which the central unit 22 follows in determining whether dusk or dawn have been detected. Before actual dawn and dusk detection is considered two preliminary steps are taken. These are to help to ensure continued useful operation of the device 1 if there is some problem with actually detecting dawn and/or dusk. One of these processes is a fall back process which covers the eventuality that dawn and/or dusk fails to be detected for a non-physically long period. If this period is exceeded, then dawn or dusk is assumed to have taken place so that the continued operation of the device is assured. Once the system determines that there is an assumed dawn or an assumed dusk, then the unit will behave as dawn or dusk has been detected as appropriate and watering will occur if the device has been so programmed.

The other preliminary step is to help protect against too much watering occurring due to false detection of dawn or dusk and also helps to minimise battery usage. Thus the device operates using a lock out period during which determination of dawn and/or dusk is prevented. The lock out period runs for a predetermined time after the most recent detection of dawn and/or dusk.

These processes will now be explained in more detail as part of the description of the flow chart shown in FIG. 6.

In step 601 it is determined whether a 14 hour (fall back) period has elapsed since the last dawn or dusk event was detected by the device. If 14 hours or more have elapsed since the last dawn or dusk event was detected, then in step 602 it is determined whether the last detected event was dawn. If the last detected event was dawn then in step 603 it is assumed to now be dusk whereas if the last detected event was not dawn then it is assumed in step 604 to now be dawn.

However, if in step 601, it was determined that not more than 14 hours have elapsed since the last dawn or dusk event, then the process moves to step 605 where it is determined where at least a six hour (lock out) period has elapsed since the last dawn or dusk event was determined. If no more than six hours have occurred then the process moves to step 606 and no action is taken at that time.

On the other hand, if more than six hours have elapsed since the last dawn or dusk event, then the dawn and/or dusk detection process proper can begin. In step 607 a sensor reading (R) from the light sensor 21 is taken. In step 608 an average of the last four readings ($\overline{R}$) is calculated. Then in step 609 it is determined whether the last determined event was dawn.

If the last determined event was dawn, then we are now looking to see whether it is dusk. Thus in step 610 a number of conditions are considered in order to determine whether dusk has occurred. These conditions have been chosen to help avoid false indications of dusk due to noise, shadows, temporary obscuring of the light sensor or so on. Note that first of all, in each case what is being considered, is the average of the last four readings and this already begins to help counter some of the false results that might otherwise be suffered. Thus in step 610 it is determined whether $\overline{R}$ is decreasing and it is determined whether the latest value of $\overline{R}$ is no more than 12.5% below the previous $\overline{R}$. This helps to avoid false indications of dusk by looking for a relatively gradual decrease in light levels rather than sudden decreases. Note, of course, that a different predetermined value or proportion than 12.5% could be chosen in this condition. The final condition is whether $\overline{R}$ is below a threshold light level set to 18 lux in this embodiment. If all of these conditions are met, then in step 611 it is determined to be dusk. However if these conditions are not all met, then in step 612 it is determined whether $\overline{R}$ is below a lower threshold level. This is chosen such that is probably, in reality, already dark rather than merely dusk and helps avoid the possibility of a dusk event being missed altogether. In the present embodiment the threshold level is set at 6 Lux. If $\overline{R}$ is below 6 Lux then in step 613 it is determined to be dusk whereas if this test is failed as well, then no action is taken at this time at step 614 i.e. it is not assumed to be dusk.

Returning now to consider the situation where, in step 609, it is determined that the last event was not dawn, then the process moves to step 615 on the basis we are now attempting to determine whether dawn has occurred. Again three conditions are considered: is $\overline{R}$ increasing, is the latest value of $\overline{R}$ no more than 12.5% above the previous value of $\overline{R}$ and is the latest value of $\overline{R}$ greater than 30 Lux. If these conditions are met then in step 616 it is determined to be dawn. However if these conditions are not met, then in step 617 a higher light threshold level is considered. This level is set such that it is probably in reality daylight rather than dawn but again this helps to avoid a dawn event being missed altogether. In the present embodiment, the test is whether $\overline{R}$ is greater than 130 Lux. If so it is assumed to be dawn at step 618 and if not it is not assumed to be dawn and no action is taken at step 619. Again, of course, each of these parameters may be set at different levels in other embodiments.

As will be appreciated these processes can be repeated at a chosen interval.

As an example, the chosen interval may be once a minute. Note however that most of the process can be avoided for the six hours following the detection of dawn and/or dusk because of the lock out period mentioned in step 605. So in fact the order of steps 601 and 605 can be reversed if desired. If the process is repeated once a minute, as is currently preferred, then, once we are not in "lock out" or "fall back", light sensor readings are being taken every minute and the average reading $\overline{R}$ calculated in step 608 represents average light levels over in effect three minutes. As will be appreciated this provides a system which is quite responsive to changing light levels at dawn and dusk.

As will be noted from above, the six hour lock out period means that during such a period no triggering of the system by nuisance light can occur. Further, even outside the lock out period, due to the conditions included in steps 610, 612, 615 and 617, triggering of the system by nuisance light is unlikely. Nuisance light changes will rarely provide smoothly changing levels of light to satisfy the conditions in steps 610 and 615, and rarely cause the necessarily low or high levels of light specified in step 612 and 617.

Thus it has been determined by the applicants that the present systems should provide reliable watering at selected desirable times (that is particularly at dawn and/or dusk) as selected by the user.

The invention claimed is:

1. A garden watering controller for operating a valve for controlling supply of water into a garden watering arrangement, the controller comprising:
   a light sensor for sensing ambient light levels, and
   a central unit for receiving sensed light level signals from the light sensor and for outputting control signals for operating the valve in dependence on the sensed light level signals; wherein
   the central unit is programmable such that the control signals output by the central unit, and hence resulting operation of the valve, are dependent on a stored program;
   the garden watering controller comprises a user interface for allowing a user to program the operation of the central unit;
   wherein the garden watering controller is programmable to provide watering operation at:
   i) dusk;
   ii) dawn;
   iii) dawn and dusk;
   and the user interface comprises a first user control for programming the controller to control whether watering should occur at dusk, dawn, or dawn and dusk; and the first user control is arranged for indicating the duration for which watering should occur at a selected time.

2. A garden watering controller according to claim 1 in which the central unit is arranged to determine the occurrence of dawn and/or dusk at the location of the controller in dependence on the sensed light level signals.

3. A garden watering controller according to claim 2 in which the central unit is arranged to determine the occurrence of dawn and dusk.

4. A garden watering controller according to claim 2 in which the central unit is arranged to operate the valve to allow watering when the occurrence of dawn and/or dusk has been determined.

5. A garden watering controller according to claim 1 in which the central unit is arranged to determine the occurrence of dawn and dusk and the stored program in turn operates in dependence on the determination by the central unit of dawn and/or dusk.

6. A garden watering controller according to claim 1 in which the user interface comprises one or more user controls for use in programming the operation of the central unit.

7. A garden watering controller according to claim 1 in which an operative range of the first user control has three segments, a first segment corresponding to operation of the valve at dawn, a second segment corresponding to operation of the valve at dusk, and a third segment corresponding to operation of the valve at dawn and dusk.

8. A garden watering controller according to claim 7 in which respective positions within each segment correspond to respective durations of watering operation at the selected time(s).

9. A garden watering controller according to claim 1 in which the user interface comprises a second user control for indicating whether watering should occur every day or at specified intervals of days.

10. A garden watering controller according to claim 1 in which the user interface comprises a user override control that operates the valve to allow immediate watering.

11. A garden watering controller according to claim 1 which the central unit is arranged to calculate a rolling average of the light level sensed by the sensor for use in determining the occurrence of dawn and/or dusk.

12. A garden watering controller according to claim 11 in which the central unit is arranged to determine the occurrence of dawn when the following are satisfied:
   i) the rolling average is increasing;
   ii) the latest rolling average is no more than a predetermined amount above the preceding rolling average; and
   iii) the latest rolling average is above a first minimum threshold value.

13. A garden watering controller according to claim 11 in which the central unit is arranged to determine the occurrence of dusk when the following are satisfied:
   i) the rolling average is decreasing;
   ii) the latest rolling average is no more than a predetermined amount below the preceding rolling average; and
   iii) the latest rolling average is below a first maximum threshold value.

14. A garden watering controller according to claim 1 in which the central unit is arranged to have a lock out period after a determination of the occurrence of dawn and/or dusk during which period the central unit will not determine another occurrence of dawn and/or dusk.

15. A garden watering controller according to claim 1 in which the central unit is arranged to assume that dawn must have occurred if a predetermined fall back period expires after the occurrence of dusk was last determined without dawn having been determined to have occurred.

16. A garden watering controller according to claim 1 in which the central unit is arranged to assume dusk must have occurred if a predetermined fall back period expires after the occurrence of dawn was last determined without dusk having been determined to have occurred.

17. A garden watering controller for operating a valve for controlling supply of water into a garden watering arrangement, the controller comprising a light sensor for sensing ambient light levels, and a central unit for receiving sensed light level signals from the light sensor and for outputting control signals for operating the valve, the central unit being arranged under the control of software to:
   a) calculate a rolling average of the light level sensed by the sensor;
   b) determine the occurrence of dawn when the following are satisfied:
      i) the rolling average is increasing;
      ii) the latest rolling average is no more than a predetermined amount above the preceding rolling average; and
      iii) the latest rolling average is above a first minimum threshold value; and
   c) determine the occurrence of dusk when the following are satisfied:
      i) the rolling average is decreasing;
      ii) the latest rolling average is no more than a predetermined amount below the preceding rolling average; and
      iii) the latest rolling average is below a first maximum threshold value; and
   d) output control signals for operating the valve in dependence on the determination of the occurrence of dawn and dusk.

18. A tap mountable garden watering controller unit comprising a valve for controlling supply of water from a tap into a garden watering arrangement, and a garden watering controller according to claim 1 for operating the valve.

19. A garden watering controller according to claim 1 in which the user interface is a control knob.

20. A tap mountable garden watering controller unit according to claim 19, wherein the garden watering controller comprises a first adapter for connecting to a tap and a second adapter for connecting to the hose.

21. A garden watering controller for operating a valve for controlling supply of water into a garden watering arrangement, the controller comprising a light sensor for sensing ambient light levels, and a central unit for receiving sensed light level signals from the light sensor and for outputting control signals for operating the valve in dependence on the sensed light level signals wherein
   the central unit is programmable such that the control signals output by the central unit, and hence resulting operation of the valve, are dependent on a stored program;
   the garden watering controller comprises a user interface for allowing a user to program the operation of the central unit;
   wherein the garden watering controller is programmable to provide watering operation at:
      i) dusk;
      ii) dawn;
      iii) dawn and dusk;
   and the user interface comprises a first user control for programming the controller to control whether watering should occur at dusk, dawn, or dawn and dusk; and
   the first user control is also arranged for indicating the duration for which watering should occur at the selected time(s),
   in which an operative range of the first user control has three segments, a first segment corresponding to operation of the valve at dawn, a second segment corresponding to operation of the valve at dusk, and a third segment corresponding to operation of the valve at dawn and dusk.

* * * * *